United States Patent [19]

Yamashita et al.

[11] 4,317,729
[45] Mar. 2, 1982

[54] ETHYLENE-VINYL ALCOHOL COPOLYMER HOLLOW FIBER MEMBRANES AND METHOD OF PRODUCING SAME

[75] Inventors: Shuzo Yamashita; Taku Tanaka; Hirokuni Tanii, all of Kurashiki; Akira Kubotsu, Soja; Syuji Kawai, Kurashiki, all of Japan

[73] Assignee: Kuraray Co., Ltd., Kurashiki, Japan

[21] Appl. No.: 142,227

[22] Filed: Apr. 21, 1980

[30] Foreign Application Priority Data

Apr. 27, 1979 [JP] Japan .................................. 54-53031

[51] Int. Cl.$^3$ ........................ B29D 27/04; D02G 3/00
[52] U.S. Cl. .................................. 210/500.2; 264/41; 428/376; 428/398
[58] Field of Search .................. 428/398, 376; 264/41; 210/500.2

[56] References Cited

U.S. PATENT DOCUMENTS 4,071,454  1/1978  Yamamoto et al. ............. 210/500.2
4,134,837  1/1979  Yamashita et al. .............. 264/41 X
4,220,543  9/1980  Yamashita et al. .............. 264/41 X Primary Examiner—Lorraine T. Kendell
Attorney, Agent, or Firm—Barry Kramer

[57] ABSTRACT

A hollow fiber membrane made of an ethylene-vinyl alcohol copolymer is provided, which is characterized in that, when observed in a dry state with an electron microscope, the hollow fiber membrane has at least one dense, active layer (or skin layer) on the inside and/or outside surface thereof and further a three-layered structure comprising two layers respectively contacting the inside and outside surfaces and each consisting of a plurality of particles bonded together and having particle sizes of 0.01 to 2 microns and a substantially particle-free homogeneous layer lying between the two layers.

A method of producing such hollow fiber membranes is also provided comprising spinning a spinning solution prepared by dissolving an ethylene-vinyl alcohol copolymer in a solvent mainly consisting of dimethyl sulfoxide, dimethylacetamide, pyrrolidone, N-methylpyrrolidone or a mixture of these through a spinneret for hollow fiber production while simultaneously introducing a coagulating liquid through the central aperture of said spinneret, passing the spun fiber through a gaseous atmosphere such that the fiber is drawn to 3 to 30 times its extrusion rate, and coagulating the fiber in a coagulation bath at a temperature within the range specified below:

When $15 \leq C \leq 40$,  $-15 \leq T \leq \frac{1}{4}C + 10$ where C is polymer concentration (weight %) and T is coagulation temperature (°C.).

7 Claims, 3 Drawing Figures

ETHYLENE-VINYL ALCOHOL COPOLYMER HOLLOW FIBER MEMBRANES AND METHOD OF PRODUCING SAME

BACKGROUND OF THE INVENTION

1. Field of the Invention

This invention relates to ethylene-vinyl alcohol (EVA) copolymer hollow fiber membranes and a method of producing the same. More particularly, it relates to novel EVA copolymer hollow fiber membranes presenting a three-layered structure comprising two layers consisting of bonded particles and a homogeneous layer lying therebetween and at least one active or skin layer on the surface of said membrane, and to a method of producing the same.

2. Description of the Prior Art

Selectively-permeable membranes, especially hollow fiber membranes, are coming into wide use in medical fields such as hemodialysis as well as in industrial fields such as in the ultrafiltration of various solutions.

EVA copolymer membranes which we have previously developed exhibit excellent biocompatibility as well as membrane performance characteristics such as water permeability and permeability to substances having medium molecular weights. Consequently, the utility of such membranes has been widely recognized in various fields.

Several EVA copolymer membranes have already been provided by the present inventors. Thus, U.S. Pat. No. 4,134,837, discloses an EVA copolymer membrane having a structure comprising particles which have particle sizes of 100 to 10,000 Angstroms and which are bonded to each other, said structure being recognizable throughout the membrane. The membrane is excellent as a dialysis membrane in hemodialysis. In copending U.S. patent application Ser. No. 962,962, filed Nov. 22, 1978, now U.S. Pat. No. 4,220,543, issued Sept. 2, 1980, there is disclosed an anisotropic membrane which is made of EVA copolymer compositions having different ethylene contents and contains cylindrical voids having a large average length as well as spherical voids having sizes ranging up to 20 microns. Said membrane, too, is excellent as a dialysis membrane. Further, in copending U.S. patent application Ser. No. 06/71,671, now U.S. Pat. No. 4,269,713, issued May 26, 1981, there is disclosed an anisotropic membrane which has a porous supporting layer containing vacuoles whose longitudinal lengths correspond to 20 to 99% of the membrane thickness. The membrane has a porosity of 60 to 90%. It is excellent as a filtration membrane for ultrafiltration.

As is mentioned above, membranes with different structures can be produced from EVA copolymers by varying production conditions. Therefore, EVA copolymers have been recognized as especially excellent materials for membranes.

As a result of further investigations, the present inventors have succeeded in producing a novel EVA copolymer hollow fiber membrane which is different in structure from those membranes described above.

SUMMARY OF THE INVENTION

Thus, the present invention provides an EVA copolymer hollow fiber membrane which is characterized in that, when observed in the dry state with an electron microscope, the hollow fiber membrane has at least one dense and active layer (or a skin layer) on the inside and/or outside surfaces thereof and further a three-layered structure comprising two layers respectively contacting the inside and outside surfaces and each consisting of a plurality of particles bonded together and having particle sizes of 0.01 to 2 microns and a substantially particle-free homogeneous layer (referred to hereinafter as the "homogeneous layer") lying between said two layers.

The membrane according to the present invention is characterized in that it has at least one active or skin layer on the membrane surface and a three-layered structure therebelow comprising two layers each consisting of particles bonded to each other and a homogeneous layer therebetween.

Known EVA copolymer membranes are divided generally into two classes. In one class, the membrane has a substantially homogeneous structure throughout the whole membrane. In the other, the membrane has an anisotropic structure comprising an active layer and a porous supporting layer lying thereunder. To the contrary, however, the membrane of the present invention, in spite of its having an active layer, has no such porous supporting layer thereunder as in the known membranes, but has a three-layered structure which comprises two layers consisting of a plurality of particles bonded together and a particle-free homogeneous layer therebetween.

As will be described in more detail later, the hollow fiber membrane of the present invention exhibits excellent performance characteristics such as sharpness of cut off function. It is higher in permeability to water, to low-molecular-weight substances such as urea and to medium-molecular-weight substances such as vitamin $B_{12}$ than the conventional EVA dialysis membranes, whereas it is highly effective in rejection of high-molecular-weight substances such as proteins and dextran. The correlation between such performance characteristics and the membrane structure has not yet been elucidated. However, it is believed that the above-mentioned structure which is entirely different from those of the conventional homogeneous EVA membranes is the very basis for the excellent membrane characteristics of the present invention. The structure of the EVA copolymer membrane as disclosed herein is a novel one that has never been disclosed with respect to membranes made of any materials including not only EVA polymers but also any other polymers.

The EVA copolymer to be used in this invention has an ethylene content within the range of 10 to 90 mole %, preferably 10 to 60 mole % and a viscosity of 1.0 to 50 centipoises as measured in a 3 weight % solution of EVA in dimethyl sulfoxide (DMSO) at 30° C. As will be described later in more detail, the EVA polymer may be a copolymer containing other copolymerizable monomer(s). Further, it may be crosslinked after membrane formation with such a crosslinking agent as an aldehyde containing one or more aldehyde groups or a diisocyanate.

BRIEF DESCRIPTION OF THE DRAWINGS

In FIG. 2, the membrane has an active layer (or skin layer) 1 on the outside surface thereof. The layer 3 which is in contact with the active layer 1 consists of a plurality of particles 2 bonded together. The inside surface 5 may be either an active layer or a microporous layer. There is a layer 3' in contact with the inside surface. The layer 3' consists of a plurality of particles 2' bonded together. Between the layers 3 and 3', there is a homogeneous layer 4, which does not present any particle structure even in an electron photomicrograph taken at a magnification of 12,000 times. If the homogeneous layer 4 had a dense or compact structure similar to that of the active layer, the membrane would not show such high permeability to water and solutes as mentioned above. Therefore, it is believed that the homogeneous layer 4 has some other different structure from the conventional dense structure. However, the structure in question has not yet been completely elucidated by the inventors. The layers 3 and 3' contain a large number of particles having sizes within the range of 0.01 to 2 microns, preferably 0.05 to 1 micron, and are constructed such that those particles which are close to the membrane surface have larger sizes and the particle size decreases with the increase in distance from the membrane surface. Smaller particle sizes than those specified above will result in unduly low permeability to water and solutes and therefore make the membrane unsuited for the purpose of the invention. Structures in which the particles have sizes above 2 microns cannot be produced by the method of the present invention. The thicknesses of the particle layers and the homogeneous layers can be varied on demand. When the thickness of the particle layer in contact with the outside surface is assumed to be 1, the thickness of the homogeneous layer is about 1 to 15, preferably 2 to 8, and the thickness of the particle layer in contact with the inside surface is about 0.2 to 3, preferably 0.2 to 2. The active layer on the membrane surface is very thin. It does not reveal any micropores or gaps even under an electron microscope (magnification 12,000×). At least one of the outside and inside surfaces has such an active layer. Without an active layer, membrane characteristics are much inferior.

A hollow fiber membrane obtained according to the present invention has an outside diameter of about 50 to 3,000 microns and a membrane thickness of about 5 to 500 microns. The outside diameter and the thickness can be adjusted as required.

Figure 1:
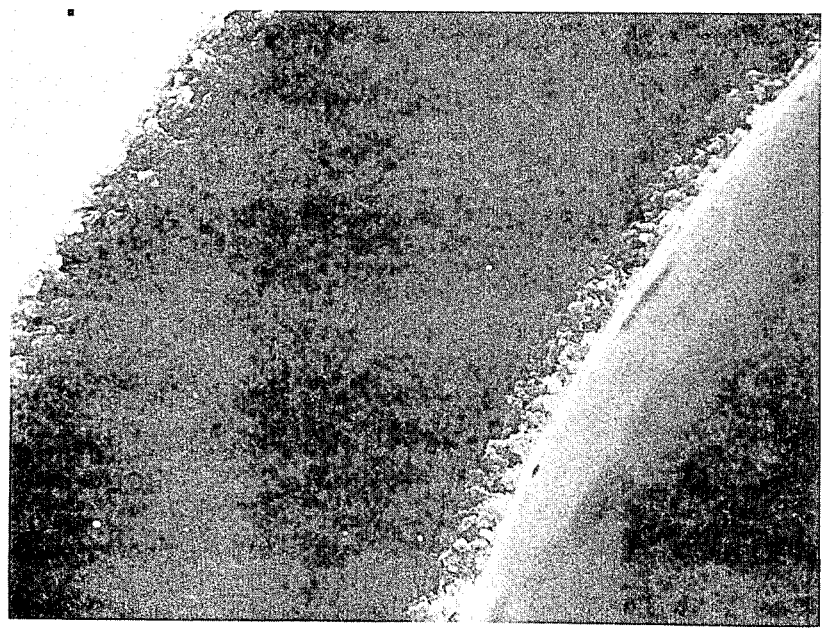
FIG. 1 is an electron photomicrograph (magnification 3,600×) of an example of the membrane according to the present invention.
Figure 2:
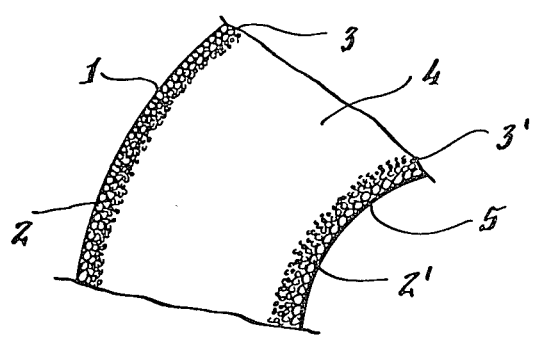
FIG. 2 is a schematic representation of the membrane shown in the photomicrograph of FIG. 1.
Figure 3:
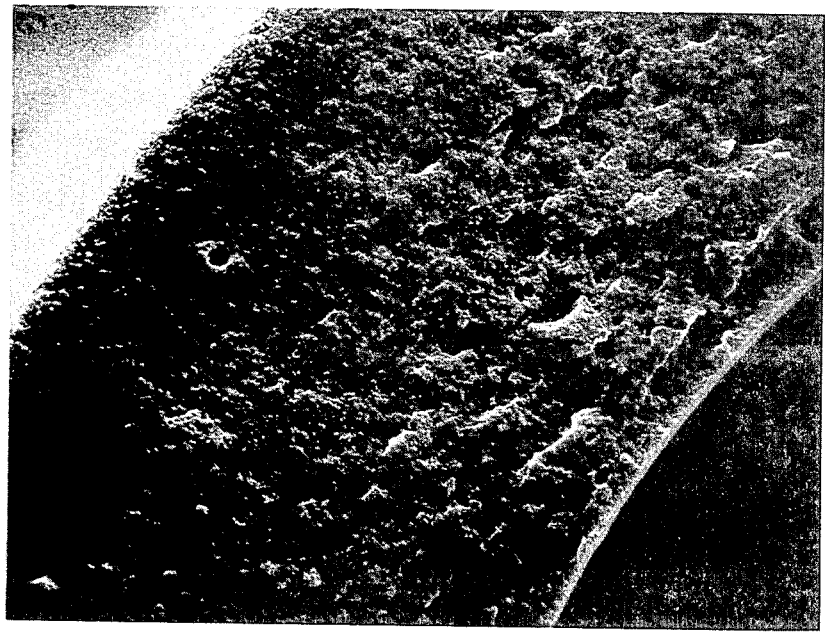
FIG. 3 is an electron photomicrograph (2,400×) of a hollow fiber membrane having the homogeneous structure as disclosed in U.S. Pat. No. 4,134,837.

FIG. 3 is an electron photomicrograph (2,400×) of a hollow fiber membrane having the homogeneous structure as disclosed in U.S. Pat. No. 4,134,837. The structure of the known homogeneous EVA membrane is clearly different from that of the membrane of the present invention.

In the present invention, the membrane structure can be examined in the following manner. A dry membrane prepared by the process to be described hereinbelow is frozen in liquid nitrogen and then broken to produce a fracture. Gold is deposited on the fracture to a thickness of about 100 Angstroms by a vapor phase deposition technique. Observation of photomicrography is performed by an electron microscope model Hitachi HFS-2.

The present invention also provides a method of producing an ethylene-vinyl alcohol copolymer hollow fiber membrane, which comprises spinning a spinning solution prepared by dissolving an ethylene-vinyl alcohol copolymer in a solvent selected from the group consisting of dimethyl sulfoxide, dimethylacetamide, pyrrolidone, N-methylpyrrolidone or a mixture thereof through a spinneret for hollow fiber production while introducing a coagulating liquid through the central aperture of said spinneret, passing the spun fiber through a gaseous atmosphere such that the fiber is drawn to 3 to 30 times its extrusion rate and subsequently coagulating the fiber in a coagulation bath at a temperature within the range satisfying the following relationship;

When $15 \leq C \leq 40$, $-15 \leq T \leq \frac{1}{4}C + 10$ where C is the polymer concentration (weight %) and T is the coagulation temperature (°C.).

The EVA copolymer to be used in the practice of the present invention may be any of those mentioned previously. As mentioned above, it may contain other copolymerizable comonomer(s) in an amount of not more than 15 mole %. Suitable comonomers include methacrylic acid, vinyl chloride, methyl methacrylate, acrylonitrile, vinylpyrrolidone and the like. The EVA copolymer may be crosslinked either before or after spinning by treating the same with an inorganic crosslinking agent such as a boron compound or an organic crosslinking agent such as a dissocyanate or a dialdehyde. Further, the copolymer may be acetalized either before or after spinning with an aldehyde such as formaldehyde, acetaldehyde, butyraldehyde or benzaldehyde to the extent of not more than 30 mole % of the functional hydroxyl groups in the vinyl alcohol units.

Whereas mono- and polyhydric alcohols such as methanol, ethanol, ethylene glycol and propylene glycol, phenol, m-cresol, methylpyrrolidone, formic acid and mixtures thereof with water are known as solvents for dissolving EVA copolymers, it is preferable for the production of the membranes of the present invention to use dimethyl sulfoxide, dimethylacetamide, pyrrolidone, N-methylpyrrolidone or a mixture thereof. Especially preferred is dimethyl sulfoxide in which EVA copolymers are highly soluble. The EVA copolymer can be dissolved in any of the solvents mentioned above preferably at a concentration within the range of 15 to 40% by weight, more preferably 18 to 30% by weight. The temperature of the polymer solution is preferably 0° to 120° C., more preferably 20° to 80° C. At higher temperatures, there is the possibility of polymer deterioration. At lower temperatures, the viscosity of the solution becomes too high or gelation of the polymer occurs, and in either case, spinning becomes difficult.

The spinning solution thus prepared is formed into a hollow fiber by extruding the solution through a spinneret for hollow fiber production such as an annular nozzle. In practicing the invention, it is necessary to introduce a coagulating liquid for the polymer solution through the central aperture of the spinneret during the spinning operation. The liquid coagulant causes coagulation on the inside surface of the hollow fiber membrane, whereby the particle layer contacting the inside surface is formed. Optionally, an active layer can be made on the inside surface by appropriately selecting the coagulation conditons.

The liquid coagulant is, for example, water alone, a mixture of water and a water-miscible organic solvent or an aqueous solution of a salt such as sodium sulfate. In the present invention, a mixture of water and the same solvent as is used for the spinning solution with a water content of 40 to 70% by weight is especially preferred. The coagulating ability of said solution is especially suited for the formation of the membrane structure.

The spun fiber extruded through the spinneret first passes through a gaseous atmosphere. Since the spun fiber remains fluid while in the gaseous atmosphere and while the spun fiber is drawn, a perfectly round configuration with a uniform wall thickness is obtained. The fiber is also subject to drawing in the gaseous atmosphere and coagulation in the coagulation bath. It is totally unexpected that such a phenomenon can occur in the production of hollow fiber membranes. In accordance with the present invention, the draw ratio for the fiber is preferably 3 to 30 times the extrusion rate and more preferably 5 to 20 times. The distance between the nozzle or spinneret and the surface of the coagulation bath is preferably about 3 to 50 mm.

The gaseous atmosphere is usually an open air space. However, in case evaporation of the polymer solution is to be controlled, it is possible to arrange a covering member having a cylindrical or other appropriate shape so that an atmosphere may be provided which is filled with the vapor from the coagulation bath or with a separately supplied vapor or through which a controlled gas stream is passed.

The spun fiber is then led into the coagulation bath and coagulated therein. The composition and temperature of the coagulation bath respectively may be selected over a broad range. However, it has been found desirable to use the same composition as that of the above-mentioned coagulating liquid for introduction through the central aperture of the spinneret. Thus, the aqueous solution of the solvent used in preparing the spinning solution, especially an aqueous solution of dimethyl sulfoxide, is preferred. The amount of each component should be determined depending upon such conditions as the composition of the coagulating liquid to be introduced through the central aperture of the spinneret and the coagulation temperature. Generally, the water content is selected within the range of 20 to 80% by weight.

The coagulation temperature is also one of the important factors influencing the formation of the membrane structure of the present invention. It has been found that the polymer concentration in the spinning solution and the temperature of the coagulation bath are each required to be in a specified range. Namely, the following relationship must be satisfied:

When $15 \leq C \leq 40$, $\quad -15 \leq T \leq \frac{1}{4}C + 10$ where C is the polymer concentration (% by weight) and T is the coagulation temperature (°C.).

The hollow fiber which has passed through the coagulation bath may be further subjected to drawing between rollers, wet heat treatment, wet heat drawing and so on in order to adjust the membrane performance and mechanical properties. The fiber may also be acetalized in the vinyl alcohol portions thereof with a monoaldehyde such as formaldehyde, acetaldehyde, chloroacetaldehyde or benzaldehyde or with a dialdehyde such as glutaraldehyde, glyoxal or PVA dialdehyde, or further, there may be introduced an ester crosslinkage with a diisocyanate such as phenylene diisocyanate or tolylene diisocyanate, or an ether crosslinkage with epichlorohydrin, or other crosslinkages. Especially preferable is the crosslinking with a dialdehyde such as glutaraldehyde because such crosslinking can improve heat durability, chemical resistance, strength, dimensional stability, etc. to a large extent.

The hollow fiber membrane according to the invention can be used either as a wet membrane or as a dry membrane. Drying can be accomplished, for example, by the method comprising replacing the water contained in the hollow fiber by a water miscible organic solvent incapable of dissolving the polymer, such as acetone, methanol or tetrahydrofuran, followed by removing the organic solvent by mild heating, or the method comprising treating the fiber during or after the membrane formation with a polyhydric aliphatic alcohol such as ethylene glycol, diethylene glycol or glycerol, followed by drying by heating at a relatively low temperature, or the freeze-dry method comprising freezing the wet membrane containing water in liquid nitrogen, for instance, followed by removing the water by sublimation of the water under reduced pressure.

The hollow fiber membrane of the present invention can have a relatively small diameter and it can be used advantageously in an artificial kidney or other medical uses because the priming volume can be reduced. It is highly permeable to water and especially to low-molecular-weight substances such as urea and further is more highly effective in rejecting high-molecular-weight substances such as proteins than known EVA membranes of homogeneous microstructure. Therefore, it is very useful as a membrane for hemodialysis or concentration of body fluid such as accumulated ascites.

The following examples further illustrate the inventions. Unless otherwise specified, all percentages and parts are by weight.

EXAMPLES 1-6 AND COMPARATIVE EXAMPLE 1

An ethylene-vinyl alcohol copolymer with an ethylene content of 33 mole % was dissolved in dimethyl sulfoxide with heating to prepare a solution with a concentration of 22% by weight. The solution was allowed to stand overnight to effect defoaming. An annular nozzle, 1.5 mm in nozzle opening diameter, 1.13 mm in outside diameter of the needle and 0.87 mm. in inside diameter of the needle, was arranged 20 mm. above the coagulation bath. (In Examples 2-6, the parameters of the nozzle used were 0.96/0.6/0.31 mm.) While feeding through the inside portion of the nozzle a mixed solvent consisting of dimethyl sulfoxide and water in a ratio of 45/55 wt/wt at a rate of 1.3 cc/min., the above defoamed spinning solution was extruded through the outer portion of the nozzle at a rate of 1.1 cc/min. into a coagulation bath containing a mixed solution consisting of dimethyl sulfoxide and water. The spun fiber was led vertically downward into the coagulation bath at a spinning rate of 30 m/min. The wet hollow fiber thus produced showed an almost perfectly round cross section with an outside diameter of 250 microns and a membrane thickness of 25 microns. Irregularities in diameter and membrane thickness could hardly be observed over a fiber length of 1 km. Thus, the resulting fiber exhibited excellent uniformity. In comparative Example 1, the fiber was directly led into the coagulation bath without passing through the air atmosphere.

Table I summarizes the conditions employed and results obtained.

TABLE I

| | Concentration (%) of DMSO in coagulation bath | Coagulation temperature (°C.) | Draw Ratio X/1 | Rate of spinning (m/min.) | Hollow Fiber Appearance (μ) Outside diameter | Inside diameter | Membrane thickness | Permeability UFR (ml/cm² · hr · atm) | Urea (cm/min) | VB$_{12}$ (cm/min.) |
|---|---|---|---|---|---|---|---|---|---|---|
| Example 1 | 20 | 4 | 20.9 | 30 | 250 | 200 | 25 | $41 \times 10^{-2}$ | $360 \times 10^{-4}$ | $47 \times 10^{-4}$ |
| 2 | " | " | 12.1 | " | " | " | " | 43 | 365 | 49 |
| 3 | " | " | 4.0 | 10 | 440 | 360 | 43 | 69 | 380 | 55 |
| 4 | " | 7 | 12.1 | 30 | 250 | 200 | 25 | 188 | 390 | 84 |
| 5 | 60 | 4 | " | " | " | " | " | 39 | 350 | 46 |
| 6 | " | 7 | " | " | " | " | " | 74 | 430 | 65 |
| Comparative Example 1 | 20 | 4 | 2.5 | 5 | 370 | 280 | 43 | 49 | 268 | 44 |

EXAMPLE 7 AND COMPARATIVE EXAMPLES 2 AND 3

The hollow fiber produced in Example 6 was fabricated into a module such that the membrane area amounted to 1.0 m², and the rejection rate of the module for dextran of a molecular weight of 10,000 and the water permeability were determined under the conditions of a rate of blood flow of 100 ml/min, with a blood pressure of 100 mmHg and a rate of dialysate flow of 0 (zero). The dextran solution subjected to the measurement had a concentration of 0.1% by weight. The rejection rate was calculated by the following formula:

$$\text{Rejection rate} = \left(1 - \frac{\text{Filtrate concentration}}{\frac{\text{Concentration at inlet} + \text{Concentration at outlet}}{2}}\right) \times 100 \, (\%)$$

In Comparative Example 2, the hollow fiber produced in Comparative Example 1 was used for the same measurement. In Comparative Example 3, a regenerated cellulose hollow fiber membrane ["Cuprophan" trademark of Enka Glanzstoff A. G.] with membrane thickness in the wet state of 30–35 microns was used.

The results are shown in Table II.

TABLE II

| | UFR (ml/hr · MMHg) | Rejection rate (%) for dextran (M.W. 10,000) |
|---|---|---|
| Example 7 | 6.7 | 55 |
| Comparative Example 2 | 4.3 | 49 |
| Comparative Example 3 | 2.9 | 75 |

What is claimed is:

1. An ethylene-vinyl alcohol hollow fiber membrane which is characterized in that, when observed in the dry state with an electron microscope, the hollow fiber membrane exhibits an annular cross section having an outer surface and an inner surface, at least one surface having a dense, active skin layer, said outer and inner surfaces separated by a three-layered structure comprising two opposed layers respectively contacting said outer and inner surfaces, said layers each consisting of a plurality of particles bonded together and having particle sizes ranging from 0.01 to 2 microns, and a substantially particle-free homogeneous layer disposed therebetween.

2. An ethylene-vinyl alcohol hollow fiber membrane as defined in claim 1 having an ethylene content of from 10 to 90 mole % and a viscosity of 1.0 to 50 centipoises as measured in a 3 weight % solution of ethylene-vinyl alcohol in dimethyl sulfoxide at 30° C.

3. An ethylene-vinyl alcohol hollow fiber membrane as defined in claim 1 wherein the particle size ranges from 0.05 to 1 micron.

4. An ethylene-vinyl alcohol hollow fiber membrane as defined in claim 1 wherein the relative thickness of the particulate layer in contact with the outer surface to the particle-free homogeneous layer to the particulate layer in contact with the inner surface ranges from 1:1 to 15:0.2 to 3.

5. An enthylene-vinyl alcohol hollow fiber membrane as defined in claim 4 wherein the relative thicknessess range from 1:2 to 8:0.2 to 2.

6. An ethylene-vinyl alcohol hollow fiber membrane as defined in claim 1 wherein the inner surface is a dense active skin layer.

7. An ethylene-vinyl alcohol hollow fiber membrane as defined in claim 1 wherein the inner surface is a microporous layer.